United States Patent [19]

Jones

[11] Patent Number: 5,288,205
[45] Date of Patent: Feb. 22, 1994

[54] INDIA-STABILIZED ZIRCONIA COATING FOR COMPOSITES

[75] Inventor: Robert L. Jones, Fairfax, Va.

[73] Assignee: The United States of America as represented by the Secretary of the Navy, Washington, D.C.

[21] Appl. No.: 589,230

[22] Filed: Sep. 26, 1990

[51] Int. Cl.$^5$ .............................................. F01D 11/08
[52] U.S. Cl. ............................... 415/200; 416/241 R; 416/241 B; 428/334; 428/469; 428/472; 428/697; 428/699; 428/701; 428/702
[58] Field of Search ............... 428/469, 472, 701, 697, 428/332, 334, 699, 702; 415/197, 200, 229; 123/668; 416/241 R, 241 B

[56] References Cited

U.S. PATENT DOCUMENTS

| | | | |
|---|---|---|---|
| 4,247,249 | 1/1981 | Siemers | 415/200 |
| 4,328,285 | 5/1982 | Siemers et al. | 428/633 |
| 4,335,190 | 6/1982 | Bill et al. | 428/623 |
| 4,397,467 | 7/1983 | Vossen, Jr. et al. | 428/697 |
| 4,399,194 | 8/1983 | Zelez et al. | 428/457 |
| 4,445,907 | 1/1985 | Kamo | 428/472 |
| 4,541,776 | 9/1985 | Schön | 415/109 |
| 4,774,150 | 9/1988 | Amano et al. | 428/701 |
| 4,880,614 | 11/1989 | Strangman et al. | 428/633 |
| 4,886,768 | 12/1989 | Tien | 501/104 |
| 4,913,961 | 4/1990 | Jones et al. | 428/332 |

OTHER PUBLICATIONS

Jones et al "Sulfation of $Y_2O_3$ and $HFO_2$ in Relation to MCrAl Coatings" Metallurgical Transactions, vol. 16A No. 2 Feb. 1985 pp. 303–306.

Jones et al "Sulfation of $CuO_2$ and $ZrO_2$ Relating to Hot Corrosion" Journ. of the Electrochem. Soc. vol. 132, No. 6 Jun. 1985 pp. 1498–1501.

*Primary Examiner*—A. A. Turner
*Attorney, Agent, or Firm*—Thomas E. McDonnell; Barry A. Edelberg

[57] ABSTRACT

A coating of india-stabilized zirconia protects a self-supporting substrate from high temperatures, as well as vanadate and sulfate corrosion. In one method of making such a protected substrate, a coating of india-stabilized zirconia is applied to the substrate. The substrate can be a metal or ceramic surface of a gas turbine or other type of engine.

10 Claims, No Drawings

INDIA-STABILIZED ZIRCONIA COATING FOR COMPOSITES

BACKGROUND OF THE INVENTION

1. Field of the Invention

The present invention relates to a thermally and chemically protective coating of india stabilized zirconia and a method for making the coating.

2. Description of the Prior Art

As demands on fuel resources increase and as manufacturing techniques become more complex, industrial equipment is exposed to fuels and materials which contain corrosive contaminants. These corrosive contaminants can cause extensive damage to the surface and structure of industrial equipment, particularly to all types of motors, turbines, engines, furnaces, stacks, fluidized beds and the like.

In addition, it is often necessary to protect industrial parts from damage and fatigue caused by operation at high temperatures. Ceramic coatings have been used to protect exposed surfaces from heat deterioration and corrosion.

Vanadium and sulfur compounds are particularly virulent corrosive materials which are found in many fuels and raw materials. Sulfur and vanadium compounds react during combustion to produce high temperature vanadium and sulfur oxide gases within the machine or engine, and also react with sodium or sodium oxide (Na being a contaminant which is found in virtually all environments and which is ingested into the engine or machine) to deposit thin films of molten sodium vanadates and sulfates on the hot machine parts such as turbine blade or piston surfaces. It is believed that vanadium is oxidized to $V_2O_5$ in engine combustion and that the sulfur compounds are present as oxides, acids and as free sulfur.

Because vanadium pentoxide ($V_2O_5$) is an acidic oxide, it reacts with $Na_2O$ (a highly basic oxide) to form a series of compounds in which the acidic nature of the compounds decreases with the $V_2O_5/Na_2O$ ratio from $Na_2V_{12}O_{31}$ (most acidic) to $Na_3VO_4$ (least acidic). Each of the acidic oxides can cause damage to machine parts. The oxides are formed as follows

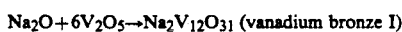

$Na_2O + 6V_2O_5 \rightarrow Na_2V_{12}O_{31}$ (vanadium bronze I)

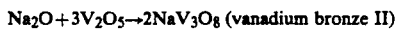

$Na_2O + 3V_2O_5 \rightarrow 2NaV_3O_8$ (vanadium bronze II)

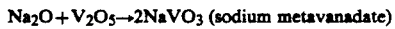

$Na_2O + V_2O_5 \rightarrow 2NaVO_3$ (sodium metavanadate)

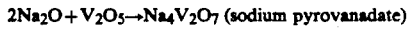

$2Na_2O + V_2O_5 \rightarrow Na_4V_2O_7$ (sodium pyrovanadate)

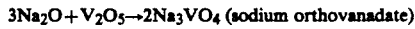

$3Na_2O + V_2O_5 \rightarrow 2Na_3VO_4$ (sodium orthovanadate)

The combination of both vanadium and sulfur compounds is particularly destructive to machines parts. Rahmel, in the "Proceedings of International Conference on Ash Deposits and Corrosion Due to Impurities in Combustion Gases," Byers, Editor, p. 185, Hemisphere, Washington, D.C. (1978), reports electrochemical studies of the corrosion of superalloys in molten sulfates containing different concentrations of the different vanadium compounds which indicate that the corrosiveness of the vanadium compounds decreases from $V_2O_5$ to $NaVO_3$ to $Na_3VO_4$.

With the increasing threat of an energy crisis, pulverized coal is becoming attractive as a fuel source, but coal also contains vanadium and sulfur compounds which can destroy the insides of furnaces, including incinerators, or other combustion equipment, stacks servicing that equipment or furnaces, and the containers of fluidized beds.

Ceramic coatings have been used in an attempt to protect surfaces from corrosion and to provide, when appropriate, a thermal barrier. Zirconia is a ceramic with excellent heat insulating properties as well as excellent resistance to corrosion by vanadium and sulfur compounds. Zirconia appears well suited to act as a protective coating to materials exposed to an atmosphere containing corrosive vanadium and sulfur compounds, but pure zirconia undergoes a catastrophic tetragonal-to-monoclinic phase structure change at 1000°-1100° C. This change results in a approximately 4% change in the volume of zirconia. Such a volume change in the working parts of a machine such as an engine, as it cycles through that temperature range, is likely to result in flaking or deterioration of coatings formed from zirconia. This loss of coating would be calamitous to the machine.

It is known that zirconia can be stabilized to the tetragonal crystal structure by the addition of stabilizer compounds such as 5-20 wt-% of calcia (CaO), magnesia (MgO), or yttria ($Y_2O_3$). Andreev et al., J Crystal Growth, V. 52, pp. 772-776 (1981), reports using zirconia crucibles stabilized with several different oxides, including scandia, to grow semiconductor crystals. Stabilized zirconia has also been used to form reaction vessels, electrodes, and solid electrolytes for high temperature electrochemical reactions.

NASA and others are developing zirconia thermal barrier coating for use on gas turbine blades and diesel engine pistons,. These coatings are expected to substantially increase engine thermal efficiency. Siemers et al., in U.S. Pat. No. 4,328,285, describes some of the prior art attempts to coat engine parts with ceramic base material, and Siemers et al. teaches using cerium oxide or ceria stabilized zirconia ceramic coatings to protect turbine and engine surfaces exposed to vanadium and sulfur compound corrosion.

However, this zirconia thermal barrier coating has not been completely successful because ceria stabilized zirconia has been found to react with, and be quickly degraded by, traces of sulfur compounds and vanadium compounds present in many commercial and industrial grade petroleum fuels. The inventor, together with colleagues, has reported in R. L. Jones, C. E. Williams, and S. R. Jones, J. Electrochem. Soc. 133, 227 (1986): R. L. Jones, S. R. Jones, and C. E. Williams, J. Electrochem. Soc. 132, 1498 (1985) and R. L. Jones and C. E. Williams, Surface and Coatings Tech. 32, Nr. 1-4, 349 (1987), that the instability of the zirconia is traceable to the leaching of the stabilizer from the coating and not to the zirconia itself. Therefore, it is desirable that the stabilizer used in the coating does not leach from the coating on high temperature exposure to vanadium and sulfur compounds.

One compound which is less subject to leaching than ceria is scandia. The use of scandia as a corrosion-resistant stabilizer for zirconia is described in U.S. Pat. No. 4,913,961 by the present inventor, the entirety of which is incorporated herein by reference. However, scandia is expensive, and therefore, is not suitable for all applications as a vanadate/sulfate resistant stabilizer. Therefore, there exists a need for a good zirconia stabilizer which is relatively inexpensive.

SUMMARY OF THE INVENTION

It is an object of the present invention to provide an inexpensive composition of stabilized zirconia that is resistant to high temperature molten vanadate and sulfate corrosion, and suitable for use as a thermal barrier coating or a corrosion protective coating in gas turbines or other engines subject to sodium (Na), sulfur (S), or vanadium (V) contaminant ingestion.

This object and other objects of the invention are achieved through the provision of a composite comprising a substrate having a coating of india stabilized zirconia which protects the substrate from vanadate and sulfate corrosion. In accordance with a further aspect of the invention, a method of making such a protected substrate is provided. In a preferred embodiment, the substrate is a surface or surfaces of a gas turbine or other type of engine.

DETAILED DESCRIPTION OF THE INVENTION

As discussed above, the use of zirconia thermal barrier coatings has been severely limited because stabilized zirconia reacts with, and is quickly degraded by traces of sulfur compounds and vanadium compounds as contained in many commercial and industrial grade petroleum fuels and other combustion or high temperature environments. Zirconia itself is resistant to molten vanadate salts (Jones et al. J. Electrochem. Soc. 133, 227 (1986) and molten sodium sulfate/sulfur trioxide (Jones et al., Metal. Trans. 16A, 303 (1985)). Principally, it is the stabilizer which is attacked. Jones et al. have shown, in J. Electrochem. Soc. 133, 227 (1986), that the predominant cause of vanadate degradation of stabilized zirconia is a Lewis acid-base reaction between the yttria stabilizer and vanadium pentoxide ($V_2O_5$), the acidic component of vanadate compounds; i.e.,

$Y_2O_3$ (basic) + $V_2O_5$ (acidic)→("neutral salt")

On the basis of this discussion, it would be expected that an oxide of the appropriate acidic nature would give reduced reaction with the acidic corrosives $V_2O_5$ and $SO_3$. However, it has been found that the acidic nature of the stabilizing oxide is a necessary but not the only condition for resistance to sulfur and vanadium compounds. This is evidenced by the experience with ceria.

Although ceria, $CeO_2$, described by Siemers in U.S. Pat. No. 4,328,285, is in fact a more acidic oxide than yttria (J. Electrochem. Soc. 132, 1498 (1985)) and should withstand molten sulfate and vanadate attack better than yttria, it does not. As found by Jones, et al., Surface and Coatings Tech. 32, Nr. 1-4, 349 (1987), $CeO_2$ is readily leached from ceria-stabilized $ZrO_2$ by $NaVO_3$, and $CeO_2$-stabilized zirconia is degraded by $NaVO_3$ to an equal or greater extent than $Y_2O_3$-stabilized $ZrO_2$ under the same test conditions. This degradation of $CeO_2$-stabilized $ZrO_2$ has been confirmed and reported by B. Nagaraj and D. J. Wortman, in "High Temperature Degradation of Ceramic Coatings in Environments Containing Sodium Sulfate and Sodium Vanadate," presented at the 1988 International Conference on Metallurgical Coatings, 11-15 April, 1988, San Diego, Calif.

Although it is not commonly known, indium sesquioxide ($In_2O_3$, also called "india" or "indium oxide") is an effective stabilizer for zirconia, as shown by Schusterius and Padurow (C. Schusterius and N. N. Padurow, Ber. Dtsch. Keram. Ges., 10, 235-239) and Morozova et al (L. V. Morozova, P. A. Tikhonov and V. B. Glushkova, Dokl Akad. Nauk SSSR (Physical Chemistry), 273, 140-144 (1983)). Certain aspects of the chemical characteristics of india also suggest that it is a more acidic Lewis acid than yttria or scandia.

One aspect of the present invention involves the discovery that zirconia stabilized with india maintains the $a_2'$ tetragonal zirconia form and produces a ceramic which is resistant to corrosion from the combined or singular effects of vanadium and sulfur compounds at elevated temperatures.

Although india is reputed to volatilize at temperatures as low as 850° C., Hohnke (D. K. Hohnke, J. Phys. Chem. Solids, 41, 777-784 (1980)) has sintered $In_2O_3$—$ZrO_2$ specimens, which contained 9.4 to 19.0 mole percent of $In_2O_3$, at 1625°-1725° C. without detectible loss of $In_2O_3$. The reputed volatility of $In_2O_3$ should therefore not prevent the satisfactory preparation of india-stabilized zirconia. Further, it may be expected that india-stabilized zirconia, and india-stabilized zirconia coatings, could be produced by virtually any method now used in the art to produce stabilized zirconia ceramics or coatings.

Although very little is yet known about phase formation and phase stability in the $In_2O_3$—$ZrO_2$ system, the preferred compositions for the invention contain between approximately 2.5 and 20.0 mole percent $In_2O_3$, most preferably between 4 and 13 mole percent $In_2O_3$. These compositions are those which are likely to yield the zirconia tetragonal crystal structure which, at least for $Y_2O_3$—$ZrO_2$, has been found to give the thermal shock resistance and general thermomechanical properties required for a successful thermal barrier coating in engines.

However, other compositions in the $In_2O_3$—$ZrO_2$ system may prove to give beneficial resistance to high temperature corrosion by molten vanadate/sulfate deposits.

Generally, the india stabilized zirconia ceramic is formed by combining acid solutions of india and a zirconia salt, neutralizing the solution to precipitate the mixed oxide ceramic precursor and recovering the precipitate. The precipitate is calcined, pressed and fired to form a dense ceramic material. The density of the ceramic can be created by isostatic pressing, hot pressing or any other means used to form ceramics.

Once formed, the stabilized zirconia ceramic is prepared in the usual manner for coating on to the substrate to be protected thus forming the composite of the present invention. The surface of the composite is the india stabilized coating.

While the primary use of this invention is as vanadate/sulfate resistant thermal barrier coatings, or simply as protective ceramic coatings, in engines, india-stabilized zirconia might be advantageously used for virtually any application where a high temperature ceramic resistant to molten vanadate/sulfate corrosion from sulfur compounds and vanadium compounds-containing fuels is required. This would include use of india-stabilized zirconia as vanes, piston caps, valve facings, cylinder liners, transition ducts, etc., in gas turbines and other types of engines. India-stabilized zirconia might also be used as electrodes and duct material in high temperature magnetohydrodynamic devices. Other applications of india-stabilized zirconia might be as claddings, nozzles, valve components, or general construction materials in waste incinerators, or other high temperature process machinery. Usually, india-stabilized zirconia will be employed as a coating on a self-supporting (especially capable of bearing weight) ceramic or metal substrate subject to mechanical stress.

The coating can be any practical thickness as is commonly used in constructing particular pieces of equipment. The coating can be as thick as ⅛ inches for thermal barrier use in large diesel engines. For the purpose of achieving corrosion resistance, coatings of up to 10 mil thick may be used in gas turbines, with 10 mils preferred and 5 mils most preferred. Coatings for corrosion resistance barriers in other engines or applications can be as thick as 50 mils or more. The india-stabilized zirconia coating need not itself be self-supporting or capable of bearing weight and will usually be thinner than the substrate layer. Generally, but not always, thermally protective coatings will be thicker (to provide greater thermal protection) than coatings intended to provide only corrosion resistance. Various ceramics and metals can be coated with india-stabilized zirconia according to the present invention. These metals include structural alloys such as steels and aluminum alloys, and well as elements such as iron and aluminum.

Molten vanadate/sulfate resistant india-stabilized zirconia thermal barrier coatings allow high efficiency burning of low cost sulfur- and vanadium-containing fuel in industrial, transport, and marine engines. Applied on a world-wide basis, this could amount to huge savings in both fuel consumption and fuel costs. Protection of engines and other machinery by india-stabilized zirconia coatings against high temperature degradation by Na, S, and V contaminants would give improved durability, and large savings through reduced repair and replacements costs. India is also considerably less expensive than scandia. Based on current prices for 99.9% pure samples of $In_2O_3$ vs. $Sc_2O_3$ (from AESAR 1989-1990 Catalog, Johnson-Matthey), the cost of india is less than 1/15 the cost of scandia in stabilized zirconia coatings of equivalent composition and thickness. Further, this price differential is likely to increase because of the greater abundance of $In_2O_3$.

That india is effective as a molten vanadate/sulfate resistant stabilizer for zirconia is demonstrated in the following examples which are given by way of illustration and not by way of limitation. In the examples, all parts are by mole-percent unless otherwise specified.

EXAMPLES

Example 1

Preparation of india-stabilized zirconia pellets

In the examples, india-stabilized zirconia (ISZ) pellets were prepared using $In_2O_3$ (99.99% purity, AESAR, Johnson Matthey, Inc.) and a zirconyl chloride-hydrochloric acid solution with a $ZrO_2$—HCl molar ratio of 1:2 ("ZOC" solution, Magnesium Electron, Inc.) A quantity of 2.14 gms of $In_2O_3$ was dissolved in 72.2 ml of $ZrOCl_2$ solution, these quantities being calculated to yield a final ceramic of 4.5 mole-percent $In_2O_3$ in $ZrO_2$, by heating and stirring the solution/powder mixture. The resulting solution was stable when cooled to room temperature. The solution was then diluted 7:1 with distilled water, and added dropwise to a stirred 3 molar $NH_4OH$ solution, which caused the In and Zr cations to be precipitated as a hydroxides in a gelatinous mass. This mass was collected by filtration, and washed repeatedly with distilled water to remove the ammonium chloride, the completeness of removal being verified by a negative test for AgCl when the wash water was treated with 0.5 molar $AgNO_3$. The precipitate mass was then given a final wash with absolute ethyl alcohol, removed from the filter, and dried at 120° C. The dried precipitate was subsequently calcined in air at 600° C. for 30 minutes to convert the precipitate to the oxide state. The calcination produced a hard, brittle cake, which was broken using a $ZrO_2$ ring mill. The resulting powder was uniaxially pressed at 100 MPa, and then sintered in air at 1400° C. for 6 minutes, using heating and cooling rates of 600° C/h. This procedure produced india-stabilized zirconia pellets of approximately 1 mm thickness and 9 mm diameter with densities higher than 96% of theoretical, and of essentially 100% tetragonal phase structure.

Example 2

Resistance of india to vanadate reaction

The driving force for the destabilization and corrosion of zirconias stabilized by $Y_2O_3$, $Sc_2O_3$ or $In_2O_3$ is thought to be the vanadate formation reaction; e.g.,

$$Y_2O_3 + V_2O_5 = 2\ YVO_4$$

If the vanadate formation reaction has a large negative Gibbs free energy, then the vanadate formed (e.g., $YVO_4$) will act as a low activity sink for the oxide (i.e., $Y_2O_3$), and the oxide will tend to be strongly depleted from the zirconia matrix. The standard Gibbs free energies for the formation of $YVO_4$, $ScVO_4$, and $InVO_4$ are not known, but their relative values, and thus the relative tendency of the oxide to react with $V_2O_5$, can be estimated by testing the pure oxides (activity=1) with sodium vanadate mixtures of increasing $V_2O_5$ activity, and monitoring by x-ray diffraction for the formation of the corresponding vanadate. Results from such tests, conducted for 24 h or longer at 700° and 900° C. and using excess sodium vanadate mixture, are shown below.

| | | TABLE OF RESULTS | | |
|---|---|---|---|---|
| Oxide | Pure NaVO₃ | NaVO₃ plus 20 m/oV₂O₅ | NaVO₃ plus 35 m/oV₂O₅ | NaVO₃ plus 50 m/oV₂O₅ |
| Y₂O₃ | | | | |
| 700° C. | YVO₄ formed | — | — | — |
| 900° C. | YVO₄ formed | — | — | — |
| Sc₂O₃ | | | | |
| 700° C. | ScVO₄ formed | — | — | — |
| 900° C. | NO REACTION | — | — | — |
| In₂O₃ | | | | |
| 700° C. | NO REACTION | NO REACTION | InVO₄ formed | InVO₄ formed |
| 900° C. | NO REACTION | NO REACTION | NO REACTION | InVO₄ formed |

These results demonstrate india to be clearly more resistant to reaction with $V_2O_5$ (i.e., to the vanadate formation reaction which depletes the stabilizing oxide from zirconia) than yttria or scandia. It is reasonable to expect therefore that india-stabilized zirconia would be more resistant to molten vanadate corrosion than either yttria- or scandia-stabilized zirconia.

Example 3

Resistance of india to sulfation reaction

Just as yttria-stabilized zirconia is destabilized and "corroded" by reaction with sodium vanadates where $YVO_4$ is formed, it can also be degraded by reaction with $SO_3$ and $Na_2SO_4$ where yttrium sulfate is formed, $$Y_2O_3 + 3\,SO_3(+Na_2SO_4) = Y_2(SO_4)_3 \text{ (in soln. in } Na_2SO_4\text{)}$$

The resistance of india vs. that of yttria to sulfate formation was accordingly compared in tests where 50 mole-percent mixtures of $Y_2O_3$—$Na_2SO_4$ and $In_2O_3$—$Na_2SO_4$ were exposed simultaneously at 700° C. for 192 h in a quartz tube furnace under a slowly flowing stream of air containing 100 Pa of $SO_3$. Under these conditions, india was 8.5% converted to indium sulfate, while yttria was 80.3% converted to yttrium sulfate. India is thus significantly more resistant to $SO_3/Na_2SO_4$ sulfation reaction than yttria, which indicates that india-stabilized zirconia should be more resistant than yttria-stabilized zirconia to molten sulfates or $SO_3/Na_2SO_4$ corrosion.

Example 4

Resistance of india-stabilized zirconia to destabilization by high temperature sodium metavanadate A 1 mm thick by 9 mm diameter pellet of india-stabilized zirconia, prepared as described, with a composition of 4.5 m/o $In_2O_3$, and consisting of 100% tetragonal phase as determined by x-ray diffraction, was deposited with 5 mg of sodium metavanadate ($NaVO_3$) and exposed at 688° C. in a tube furnace. The loading of $NaVO_3$ corresponds to approximately 8 mg of salt/cm$^2$ of zirconia, which represents a severe test since salts deposits on, e.g., gas turbine blades seldom exceed 1-2 mg/cm$^2$. When examined by x-ray after 66 h at the temperature of 688° C., the zirconia was indicated to still be 100% tetragonal, i.e., no destabilization of the india-stabilized zirconia had occurred. This performance is substantially superior to yttria-stabilized zirconia, where pellets of $Y_2O_3(4.5m/o)$-$ZrO_2$, prepared in the same manner as described, are strongly destabilized by sodium metavanadate deposits after only 2-4 h at 700° C.

Example 5

Resistance of india-stabilized zirconia to destabilization by high temperature sodium metavanadate A second pellet of india-stabilized zirconia of $In_2O_3(4.5m/o)$-$ZrO_2$, prepared in the same manner and essentially identical to the ISZ pellet cited in EXAMPLE 3, and also consisting of 100% tetragonal phase, was deposited with 10 mg of sodium metavanadate and exposed in a furnace at 695° C. for 159 hrs. At the end of this time, the pellet was found to consist of approximately 93% tetragonal phase/7% monoclinic phase, or to have suffered 7% destabilization. This performance, under an extraordinarily heavy deposit of $NaVO_3$ (16 mg/cm$^2$) and extended time at a high temperature, is substantially superior to that which has been achieved with $Y_2O_3(4.5m/o)$-stabilized zirconia.

Example 6

Resistance of india-stabilized zirconia to destabilization by the effects of high temperature mixed sodium vanadate/sodium sulfate deposits.

A pellet of $In_2O_3(4.5m/o)$-$ZrO_2$, prepared similarly and of identical dimensions to the ISZ pellets used in EXAMPLES 3 and 4, but consisting of 88% tetragonal/12% monoclinic phase, was deposited with 5 mg of a mixture of 50 m/o $NaVO_3$—$Na_2SO_4$, and exposed in a furnace at 705° C. After 169 h of such exposure, the ISZ pellet was indicated by x-ray diffraction to consist of 69% tetragonal/31% monoclinic phase, or to have suffered, as a result of the effects of the 50 m/o $NaVO_3$—$Na_2SO_4$ surface deposit, an increase in destabilization of 19%. This resistance of ISZ to mixed $NaVO_3$—$Na_2SO_4$, i.e., only 19% destabilization induced in 169 h, is superior to that of $Y_2O_3(4.5m/o)$-$ZrO_2$, where 50 m/o $NaVO_3$—$Na_2SO_4$ produced 60% destabilization of the YSZ in only 71 h at 700° C.

Obviously many modifications and variations of the present invention are possible in the light of the above teachings. It is therefore to be understood that within the scope of the appended claims the invention may be practiced otherwise than as specifically described.

What is claimed is:

1. A combustion engine having improved resistance to corrosion from sodium vanadates and sodium sulfates, said engine comprising metal surfaces and including a coating of tetragonal zirconia, stabilized with about 2.5 and 20.0 mole percent india, on said surfaces.

2. The engine according to claim 1, wherein said coating comprises at least about 4 to 13 mole percent $In_2O_3$.

3. The engine according to claim 1, wherein said coating is up to about 10 mils thick.

4. A method for protecting the surface of a combustion engine from corrosion by sodium vanadates and sodium sulfates comprising applying a coating of tetragonal zirconia, stabilized with about 2.5 and 20.0 mole percent india, to that surface of the engine.

5. The method according to claim 4 wherein the surface is a metal.

6. The method according to claim 4, wherein the surface is a ceramic.

7. The method according to claim 4, wherein said coating comprises at least about 4 to 13 mole percent $In_2O_3$.

8. The method according to claim 4, wherein said coating is up to about 50 mils thick.

9. The method according to claim 4, wherein said coating is up to about 10 mils thick.

10. The method according to claim 4, wherein said coating is up to about 5 mils thick.

* * * * *